US 11,046,268 B2

(12) United States Patent
Bader et al.

(10) Patent No.: US 11,046,268 B2
(45) Date of Patent: Jun. 29, 2021

(54) BUMPER FOR A MOTOR VEHICLE AND METHOD FOR ITS PRODUCTION

(71) Applicant: CONSTELLIUM SINGEN GMBH, Singen (DE)

(72) Inventors: Alexander Bader, Singen (DE); Paul Konkel, Volkertshausen (DE); Fabian Pfaender, Tuttlingen (DE); Matthias Kutscher, Constance (DE); Frank Gensty, Ostrach (DE); Egon Mayr, Tegernbach (DE)

(73) Assignee: CONSTELLIUM SINGEN GMBH, Singen (DE)

( * ) Notice: Subject to any disclaimer, the term of this patent is extended or adjusted under 35 U.S.C. 154(b) by 0 days.

(21) Appl. No.: 16/306,017

(22) PCT Filed: May 19, 2017

(86) PCT No.: PCT/EP2017/062184
§ 371 (c)(1),
(2) Date: Nov. 30, 2018

(87) PCT Pub. No.: WO2017/211573
PCT Pub. Date: Dec. 14, 2017

(65) Prior Publication Data
US 2019/0315299 A1 Oct. 17, 2019

(30) Foreign Application Priority Data
Jun. 8, 2016 (EP) .................................... 16173592

(51) Int. Cl.
*B60R 19/18* (2006.01)
*B21C 23/00* (2006.01)
(Continued)

(52) U.S. Cl.
CPC ............ *B60R 19/18* (2013.01); *B21C 23/002* (2013.01); *B21D 53/88* (2013.01); *B60R 19/023* (2013.01);
(Continued)

(58) Field of Classification Search
CPC ....... B60R 19/18; B60R 19/023; B60R 19/03; B60R 2019/182
(Continued)

(56) References Cited

U.S. PATENT DOCUMENTS 7,931,315 B2 * 4/2011 Hori .................... B60R 19/18
293/102
8,505,990 B2 * 8/2013 Czopek ................ B60R 19/18
293/102

(Continued)

FOREIGN PATENT DOCUMENTS

DE  10 2008 022 564 A1  11/2009
DE  20 2008 016 644 U1  4/2010
(Continued)

OTHER PUBLICATIONS

International Search Report, dated Jun. 30, 2017, corresponding to International Application No. PCT/EP2017/062814.

*Primary Examiner* — Gregory A Blankenship
(74) *Attorney, Agent, or Firm* — Ladas & Parry LLP; Malcolm J. MacDonald

(57) ABSTRACT

The invention relates to a bumper (10) for a motor vehicle, with a crossmember element (20) which has preferably two homogeneous outer sections (12, 13) and a central section (11) differing from the outer sections (12, 13), wherein the central section (11) is displaced vertically downwards or upwards with respect to the two outer sections (12, 13). According to the invention, provision is made that the crossmember element (20) is constructed as an extrusion and
(Continued)

Figure 1:
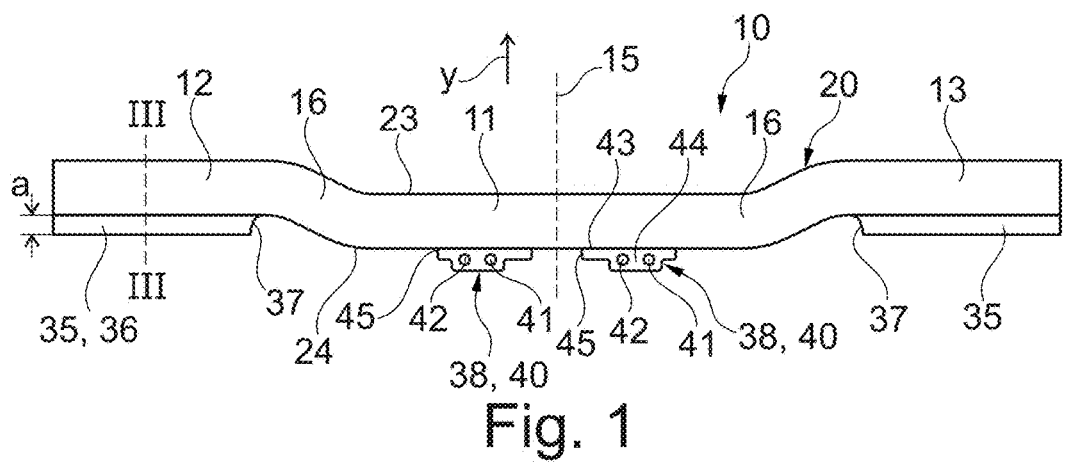

in that at least one of the sections (11 to 13) has at least one additional element (35, 38, 39) arranged monolithically with the crossmember element (20).

20 Claims, 1 Drawing Sheet

(51) Int. Cl.
    *B21D 53/88*     (2006.01)
    *B60R 19/02*     (2006.01)
    *B60R 19/03*     (2006.01)

(52) U.S. Cl.
    CPC ........ *B60R 19/03* (2013.01); *B60R 2019/182* (2013.01)

(58) Field of Classification Search
    USPC ........................................................ 293/102
    See application file for complete search history.

(56) References Cited

U.S. PATENT DOCUMENTS

| | | | | |
|---|---|---|---|---|
| 9,156,417 | B2 * | 10/2015 | Mori | B60R 19/34 |
| 2001/0017473 | A1 * | 8/2001 | Yamamoto | B60R 19/18 293/102 |
| 2002/0079711 | A1 * | 6/2002 | Kajiwara | B60R 19/18 293/133 |
| 2004/0164566 | A1 * | 8/2004 | Jaeger | B60R 19/18 293/102 |
| 2007/0039282 | A1 | 2/2007 | Holl et al. | |
| 2008/0143125 | A1 * | 6/2008 | Nees | B60D 1/485 293/117 |
| 2010/0194127 | A1 | 8/2010 | Müller et al. | |
| 2011/0031769 | A1 * | 2/2011 | Loeffler | B60R 19/04 293/146 |
| 2015/0274101 | A1 * | 10/2015 | Kaneko | B60R 19/24 293/154 |
| 2016/0297387 | A1 * | 10/2016 | Prasoody | B60R 19/18 |
| 2016/0304044 | A1 * | 10/2016 | Kutscher | B60R 19/34 |
| 2017/0166148 | A1 * | 6/2017 | Freundl | B60R 19/18 |
| 2017/0253203 | A1 * | 9/2017 | Nusier | B60R 19/18 |
| 2018/0215332 | A1 * | 8/2018 | Garnweidner | B60R 19/18 |
| 2019/0315299 | A1 * | 10/2019 | Bader | B60R 19/04 |
| 2020/0339052 | A1 * | 10/2020 | Rebstock | B21D 28/26 |

FOREIGN PATENT DOCUMENTS

| | | | |
|---|---|---|---|
| EP | 2 082 924 A1 | 7/2009 | |
| FR | 2 908 714 | 5/2008 | |
| JP | 2020-163877 | * 10/2020 | ............ B60R 19/18 |
| WO | 2016/007661 A1 | 1/2016 | |

* cited by examiner

BUMPER FOR A MOTOR VEHICLE AND METHOD FOR ITS PRODUCTION

PRIOR ART

The invention relates to a bumper for a motor vehicle according that has a crossmember element with two similar outer sections and a central section differing from the outer sections, wherein the central section is displaced vertically downwards or upwards with respect to the two outer sections. In addition, the invention relates to a method for the production of a bumper according to the invention.

A bumper for a motor vehicle that has a crossmember element with two similar outer sections and a central section differing from the outer sections, wherein the central section is displaced vertically downwards or upwards with respect to the two outer sections is known from U.S. Pat. No. 3,871,695. The known bumper has a crossmember element, which is formed from a profile which is U-shaped in cross-section. The central section of the crossmember element is displaced vertically upwards with respect to the two outer sections. Furthermore, struts are fastened to the two outer sections of the crossmember element, in particular by a welded connection, which serve for fastening the bumper to a frame of the motor vehicle. The connections between the central section and the two outer sections on the crossmember element are respectively formed by intermediate sections, constructed in a rectilinear manner, with a constant cross-section. Such a crossmember element can be produced in that the individual sections and the intermediate sections connecting the sections are individually cut to length, provided with chamfers and subsequently welded to one another. It is a disadvantage in the known bumper that its manufacture is relatively complex owing to the requirement of welding various components to one another, which are respectively produced individually.

From EP 2 082 924 B1 a further bumper is known for a motor vehicle that has a crossmember element with two similar outer sections and a central section differing from the outer sections, wherein the central section is displaced vertically downwards or upwards with respect to the two outer sections. In this bumper, in the region of the outer sections respectively crash boxes are arranged as fastening elements for the bumper on the motor vehicle. No information can be seen from the said publication as to the manner in which the crossmember element is produced or respectively manufactured. Example embodiments can also be seen from the said publication, in which the height of the profile cross-section in the central region is greater than the height of the profile cross-section at the outer regions. Such a crossmember element can be produced in particular from several sheet metal parts, respectively plastically deformed or respectively pressed, which are connected to one another, for example by means of welded connections.

DISCLOSURE OF THE INVENTION

Proceeding from the presented prior art, the invention is based on the problem of further developing a bumper for a motor vehicle that has a crossmember element with two similar outer sections and a central section differing from the outer sections, wherein the central section is displaced vertically downwards or upwards with respect to the two outer sections, such that, with a low weight and simple producibility and good strength- or respectively crash characteristics, it enables at least one additional functionality. For example, an increased strength or respectively improved crash characteristics in one of the various sections of the crossmember element and/or the possibility of the construction of an additional fastening possibility of another element on the bumper are understood as an additional functionality within the scope of the invention.

This problem is solved according to the invention in a bumper for a motor vehicle wherein the crossmember element is constructed as an extrusion and wherein at least one of the sections has at least one additional element arranged monolithically with the crossmember element.

The invention is based on the idea of already taking into consideration an additional element necessary for fulfilling the mentioned additional functionality during the manufacture of the crossmember element, in so far as the additional element is arranged monolithically on the crossmember element, which is constructed as an extrusion. It is therefore not necessary to manufacture the additional element separately or respectively to connect it to the crossmember element by an additional manufacturing step. Through the monolithic construction of the crossmember element together with at least one additional element, it is possible to obtain a crossmember element of relatively light weight whereby simultaneously a particularly strong connection between the additional element and the crossmember element is achieved. Moreover, the fastening of the additional element to the crossmember element also does not require any additional installation space, as is necessary for example when the additional element is connected to the crossmember element by means of screw connections or similar fastening elements. Furthermore, a particularly simple adaptation of the bumper to the most varied of applications is made possible, by the size of the additional element and its arrangement on the crossmember element taking place, depending on the respective application, by corresponding removal of the partial regions, not serving as additional element, from the cross-section of the crossmember element.

Advantageous further developments of the bumper for a motor vehicle according to the invention are cited in the subclaims. All combinations of at least two of the features disclosed in the claims, in the description and/or in the figures, fall within the scope of the invention.

In preferred structural configuration of the additional element, the latter is constructed so as to be a flange. Thereby, with a relatively low weight, a high strength or respectively rigidity and/or a large connecting surface with another component can be achieved.

So as not to increase the overall size of the bumper in longitudinal direction of the motor vehicle, provision is preferably made that the at least one additional element is arranged in the region of a front wall or a rear wall of the crossmember element, and that the height of the crossmember element in the region of the at least one additional element is increased by the at least one additional element. In other words, this means that the at least one additional element is arranged in the upper and/or lower region of the crossmember element. Thereby, an optimum functionality can be enabled with a view to the use as fastening element or respectively reinforcing element.

To minimize the height of the bumper, provision is made in the construction of the additional element and in its positioning with regards to the vertical offset of the central section. It is possible to minimize the height by arranging the additional element—viewed in vertical direction—on the same side as the central section is positioned in case that the additional element is arranged on an outer section of the crossmember element. Thereby, the height of the bumper is influenced solely by the arrangement of the sections of the crossmember element, but not by the additional element, as long as the additional element does not have a height which is greater than the vertical offset of the central section to the outer sections.

Moreover, it is particularly preferred if the crossmember element has the shape of a vertically displaced S-curve respectively in the transition region from an outer section to the central section. An "S-curve" is understood to mean in particular a course which has no bends or respectively corners, but rather a curved course provided with radii or roundings. Such a course can in particular already be achieved e.g. during the construction of the crossmember element as an extrusion, or subsequently by inserting the crossmember element into a correspondingly shaped mount of a press device, wherein through the harmonic transition between the outer regions to the central region, a particularly simple deformation is able to be achieved with good strength characteristics.

In view of the desired advantageous crash characteristics with, at the same time, a low weight, it is, moreover, advantageous if the cross-section of the crossmember element has at least one hollow chamber. The manufacture of the crossmember element as an extrusion makes it possible, moreover, in a particularly simple manner, to construct the cross-section of the crossmember element with several hollow chambers, typically two chambers, 3 chambers or 4 chambers or more, through the provision of corresponding cross webs or respectively cross walls.

A reduction of the notch effect in the transition region between the additional element and the rest of the crossmember element can be achieved when the additional element is constructed with a chamfer or a rounding on a lateral end section towards the crossmember element.

The construction of the bumper from aluminium alloys, preferably from 6XXX series alloys, is particularly preferred, because aluminium alloy has relatively high strength values with a low weight and 6XXX series alloy permit a good extrudability. The alloys are designated according to the regulations of The Aluminum Association, known to a person skilled in the art.

The invention also comprises a method for producing a bumper according to the invention in so far as described. The method according to the invention provides the following steps: Firstly in the extrusion process a crossmember profile cross section is formed, on which at least one additional element section is provided, which is formed in one piece on the crossmember profile cross-section. Subsequently, a separation takes place at least of a partial region of the additional element section from the crossmember profile cross-section. The separating of the at least one partial region of the additional element section takes place in those partial regions in which the bumper is to have no additional element.

It is preferred if the separating of the at least one partial region of the additional element section takes place by stamping. Stamping has the advantage in particular in the manufacture of large quantities of bumpers that the relatively high investment costs for the stamping tool can be redeemed relatively quickly. Alternatively, in particular in the case of relatively small quantities or in prototype construction, other separation methods can also come into use, for example milling, or the use of a laser beam device.

Moreover, it is preferred that the crossmember profile section, for the instance where the bumper is to have a curved shape, is plastically deformed in at least one direction after the separation of the at least one partial region of the additional element section. Thereby, it is possible to remove in advance in a particularly simple manner the regions of the additional element section not serving as additional elements, because the bumper is constructed in a straight line before it is deformed or respectively bent and therefore is particularly readily accessible for the separating tools.

Further advantages, features and details of the invention will emerge from the following description of preferred example embodiments and with the aid of the drawings.

Figure 2:
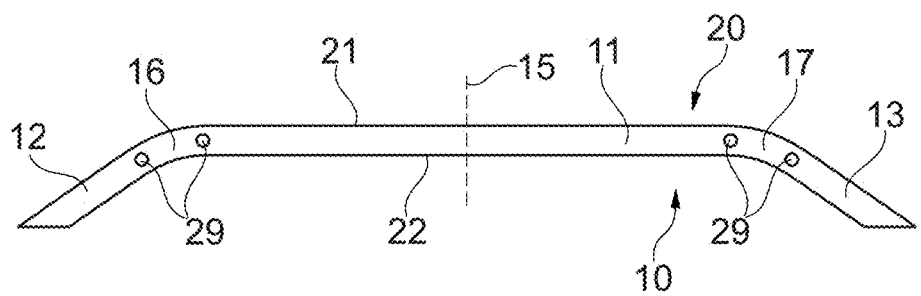
Figure 3:
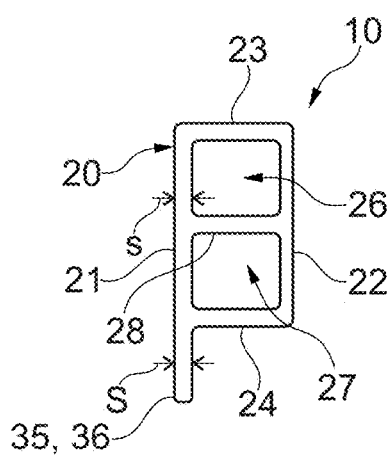

These show in:
FIG. 1 a front view onto a bumper for a motor vehicle.
FIG. 2 a top view onto the bumper according to FIG. 1.
FIG. 3 a section in the plane III-III of FIG. 1 and
FIG. 4 a section in the plane III-III of FIG. 1 in a modified crossmember element, which is constructed for fastening on a crash box or respectively a longitudinal beam of a vehicle.

Identical elements or respectively elements having the same function are given the same reference numbers in the figures.

The bumper 10 for a motor vehicle, illustrated in FIGS. 1 to 3, is constructed to be fastened on a vehicle front of the motor vehicle. Basically, however, the use of the bumper 10 is not to be limited to the use on a vehicle front, rather, such a bumper 10 is also to be basically suitable or respectively constructed to be fastened to the rear region of a motor vehicle.

The bumper 10, consisting of aluminium, is produced by the extrusion process and has a crossmember element 20 with a central section 11, to which on both sides in each case an outer section 12, 13 adjoins. The arrangement of the sections 11 to 13 is preferably symmetrical to a longitudinal plane of the bumper 10, wherein the longitudinal plane 15 coincides with the longitudinal axis of the vehicle. The two outer sections 12, 13 are respectively constructed to be of equal length and have respectively a length which is between 10% and 30% of the overall length of the bumper 10. Furthermore, the two outer sections 12, 13 are constructed at least substantially similar. An at least substantially similar construction is also to include the case that in only one of the two sections 12, 13, for example in the left-hand section 12 in the direction of the vehicle longitudinal axis 15, an opening or similar is arranged for fastening a towing eye.

As can be seen in particular by means of FIG. 1, the central section 11 is arranged offset vertically downwards in the direction of a Y-axis with respect to the two outer sections 12, 13. When the crossmember element 20 is attached to a vehicle, the Y axis is vertical with respect to the environment. Of course, it also lies within the scope of the invention that the central section 11 is arranged offset vertically upwards with respect to the outer sections 12, 13 in relation to the Y-axis. The central section 11 is connected with the respective outer section 12, 13 via a transition region 16, 17 constructed in the form of a vertically displaced S-curve. Preferably, no additional elements are present in the S area. Furthermore, it can be seen with the aid of FIG. 2 that the central section 11 runs at least substantially for example in relation to the longitudinal plane 15 perpendicularly to the latter and is constructed so as to be flat. By comparison, the two outer sections 12, 13, which are likewise constructed so as to be flat, are arranged at an angle in relation to the central section 11, wherein the arrangement takes place by a deformation at least substantially in the region of the transition regions 16, 17.

The crossmember element 20 of the bumper 10 has a front wall 21, a rear wall 22 and an upper wall 23 and a lower wall 24.

The front wall 21 is arranged parallel to the rear wall 22 and the upper wall 23 is arranged parallel to the lower wall 24. In accordance with the illustration of FIG. 3, the crossmember element 20 forms a closed, rectangular cross-section with two hollow chambers 26, 27. The two hollow chambers 26, 27 are formed by a dividing wall 28 running within the cross-section of the crossmember element 20 centrally between the upper wall 23 and the lower wall 24.

In the region of the transition regions 16, 17, the crossmember element 20 has respectively by way of example fastening openings 29, which are constructed to be connected respectively with a crash box, which is not shown. The crash boxes are mounted, in turn, on longitudinal beams of the motor vehicle, which is not illustrated. The fastening openings 29 therefore serve, together with the crash boxes, for fastening the bumper 10 on the motor vehicle.

The distances between the front wall 21 and the rear wall 22 and between the upper wall 23 and the lower wall 24 are constant over the entire length of the bumper 10. Thereby also the cross-section or respectively the size of the hollow chambers 26, 27 is constant over the entire length of the bumper 10. An additional element 35 is formed in one piece on the crossmember element 20 on the front wall 21 respectively in the direction of the underside of the bumper 10, i.e. on the side facing the central section 11. The additional element 35 serves to improve the crash characteristics of the bumper 10 or respectively to fulfil standards which for example require particular degrees of overlap at a test barrier. The additional element 35 is constructed so as to be strip-shaped or respectively plate-shaped and runs flush with the front wall 21 of the crossmember element 20. The two additional elements 35 therefore form extensions of the front wall 21. The wall thickness S of the additional elements 35 can either be identical to the wall thickness s of the front wall 21, or else can deviate therefrom. The height a of the additional elements 35 is for example such that the additional elements 35 terminate above the plane of the lower wall 24 of the central section 11. The additional elements 35 serve as reinforcing elements 36 of the bumper 10 or respectively of the crossmember element 20. Preferably, the reinforcing elements 36 extend in a longitudinal direction over the complete length of the two outer sections 12, 13 and end at the region of the transition sections 16. In an embodiment the height of the reinforcing elements 36 in the vertical (Y axis) direction is adapted to achieve a certain overlap with test barriers used in crash tests arrangements. On the side facing the transition region 16, 17, the additional elements 35, having a constant height a, have respectively a rounded end section 37.

The central section 11 of the bumper 10 has, moreover, in the region of its underside, two further additional elements arranged spaced apart from one another. The further additional elements 38 are likewise constructed so as to be flange shaped and are arranged aligned and/or in extension of the rear wall 22. The further additional elements 38 have, by way of example, respectively two fastening openings 41, 42. The further additional elements 38 serve as fastening elements 40 for fastening additional parts located at the region of the bumper 10, for example a strut (not illustrated), connected with a cooler of the motor vehicle. In contrast to the reinforcing elements 36, the fastening elements 40 do not have the function to strengthen the bumper 10 in order to achieve better crash-test results The further additional elements 38 are also formed in one piece onto the cross-section of the crossmember element 20 or respectively are connected in one piece therewith. The further additional elements 38 have two sections 42, 43 of different height. In the one section 42, the fastening openings 37, 38 are constructed. The further additional elements 38 also have end sections 45, constructed in a rounded manner, in the transition region to the crossmember element 20.

Figure 4:
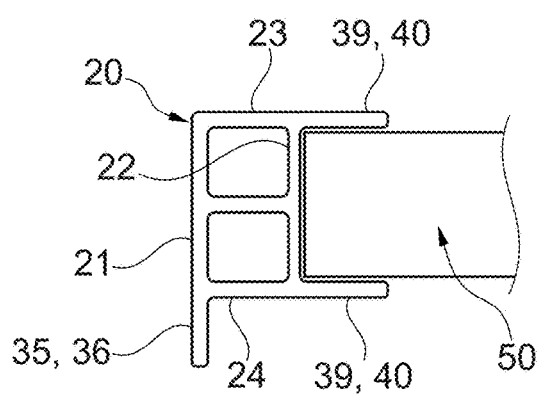

In FIG. 4 the case is illustrated in which the crossmember element 20 has respectively an additional element 39 as fastening element 40 in the region of the upper wall 23 and of the lower wall 24, which serves for fastening a crash box 50, only shown in part, or a longitudinal beam of the vehicle on the crossmember element 20. Preferably, the two additional elements 39 are arranged in the region of the rear wall 22 aligned or respectively in extension of the upper wall 23 and the lower wall 24. However, provision can also be made that the additional elements 39 are not arranged aligned, but parallel to the upper wall 23 and to the lower wall 24. Between the two additional elements 39 the end section of the crash box 50, facing the crossmember element 20, is received and is connected by fastening means—not shown—with the additional elements 39.

The manufacture of the bumper 10 with additional elements 35, 38 formed in one piece thereon takes place as follows: Firstly, in a first step, a crossmember profile cross-section, consisting of the front wall 21, the rear wall 22, the upper wall 23, the lower wall 24 and the dividing wall 28, is constructed together with two additional element sections, formed on in one piece, by the extrusion process. The two additional element sections serve for the construction of the additional elements 35, 38, 39. Subsequently, from the (endless) crossmember profile cross-section which is thus formed, a piece of a length is separated off, which corresponds to the length of the bumper 10 which is to be manufactured. Thereafter, a separating takes place of partial regions of the two additional element sections in the regions which do not form any additional elements 35, 38 and 39. The separating of the partial regions from the additional element sections preferably takes place by stamping. The separating of the partial regions of the additional element sections includes at the same time the forming of the end sections 37, 45, constructed in a rounded manner. Preferably after the separating of the partial regions of the additional element sections, the deformation takes place of the blank bumper 10 into its final form, i.e. the forming of the transition regions 16, 17 and the other roundings or respectively deformations on the bumper 10. This takes place for example by inserting the blank bumper 10 into a corresponding press tool.

The bumper 10, in so far described, can be altered or respectively modified in a variety of ways, without deviating from the idea of the invention.

The invention claimed is:

1. A bumper for a motor vehicle, comprising:
a crossmember element having a closed rectangular cross-section, a front wall, a rear wall, an upper wall, a lower wall, a central section, and opposing first and second outer sections,
wherein the crossmember element comprises a first transition region between the central section and the first outer section, and a second transition region between the central section and the second outer section,
wherein the first outer section comprises a first flange extending downwardly from the front wall or the rear wall, and the second outer section comprises a second flange extending downwardly from the front wall or the rear wall, when the bumper is mounted horizontally on the motor vehicle,
wherein the first flange extends longitudinally along the first outer section and ends at the first transition region, and the second flange extends longitudinally along the second outer section and ends at the second transition region, when the bumper is mounted horizontally on the motor vehicle, wherein the central section is offset vertically downwards, or upwards, relative to the first and second outer sections when the bumper is mounted horizontally on the motor vehicle, and wherein the crossmember element is constructed as an extrusion, and the first and second flanges are arranged monolithically with the crossmember element.

2. The bumper according to claim 1, further comprising a third flange extending from the upper wall, and a fourth flange extending from the lower wall, when the first and second flanges extend from the front wall of the crossmember element.

3. The bumper according to claim 1, wherein a height of the crossmember element is increased in a vertical direction in the region of the first and second flanges.

4. The bumper according to claim 1, wherein the first and second flanges extend flush with the front wall or the rear wall of the crossmember element.

5. The bumper according to claim 1, wherein the first and second flanges are configured to reinforce the crossmember element.

6. The bumper according to claim 1, further comprising a fastening element extending from the central section.

7. The bumper according to claim 2, wherein the second and third flanges are configured to fasten the bumper to a part of the motor vehicle.

8. The bumper according to claim 1, wherein the first transition region and the second transition region are in a form of a vertically displaced S-curve.

9. The bumper according to claim 2, wherein the third flange extends flush with the upper wall, and the fourth flange extends flush with the lower wall.

10. The bumper according to claim 1, wherein the crossmember element is curved, at least in portions, relative to a direction running perpendicularly to a longitudinal plane.

11. The bumper according to claim 1, wherein end sections of the first and second flanges comprise a chamfer towards the crossmember element.

12. The bumper according to claim 1, wherein the bumper comprises an aluminium alloy.

13. The bumper according to claim 12, wherein the aluminium alloy is a 6XXX series alloy.

14. The bumper according to claim 1, wherein the central section is offset vertically downwards, relative to the first and second outer sections, when the bumper is mounted horizontally on the motor vehicle.

15. The bumper according to claim 2, wherein the third and fourth flanges are arranged monolithically with the crossmember element.

16. The bumper according to claim 1, wherein the crossmember element comprises two hollow chambers separated by a dividing wall running centrally between the upper wall and the lower wall, and wherein the dividing wall runs horizontally within the rectangular cross-section when the bumper is mounted horizontally on the motor vehicle.

17. A method for producing the bumper according to claim 1, the method comprising at least the following steps:

forming, by an extrusion process, a crossmember profile cross-section with at least one additional element section formed in one piece on the crossmember profile cross-section; and separating a partial region of the additional element section from the crossmember profile cross-section.

18. The method according to claim 17, wherein the separating takes place by stamping.

19. The method according to claim 17, further comprising plastically deforming the crossmember profile section in at least one direction after the separating off of the partial region of the additional element section.

20. A motor vehicle comprising the bumper according to claim 1.

* * * * *